(12) United States Patent
Siddappa et al.

(10) Patent No.: US 11,687,364 B2
(45) Date of Patent: Jun. 27, 2023

(54) METHODS AND APPARATUS FOR CACHE-AWARE TASK SCHEDULING IN A SYMMETRIC MULTI-PROCESSING (SMP) ENVIRONMENT

(71) Applicant: SAMSUNG ELECTRONICS CO., LTD., Suwon-si (KR)

(72) Inventors: Raju Udava Siddappa, Karnataka (IN); Chandan Kumar, Karnataka (IN); Kamal Kishore, Karnataka (IN); Tushar Vrind, Karnataka (IN); Venkata Raju Indukuri, Karnataka (IN); Balaji Somu Kandasamy, Karnataka (IN)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 277 days.

(21) Appl. No.: 16/930,647

(22) Filed: Jul. 16, 2020

(65) Prior Publication Data
US 2021/0034416 A1   Feb. 4, 2021

(30) Foreign Application Priority Data

Jul. 30, 2019   (IN) .............................. 201941030813

(51) Int. Cl.
G06F 9/46 (2006.01)
G06F 9/48 (2006.01)
G06F 12/0842 (2016.01)

(52) U.S. Cl.
CPC ........ *G06F 9/4881* (2013.01); *G06F 12/0842* (2013.01); *G06F 2209/486* (2013.01); *G06F 2212/1041* (2013.01)

(58) Field of Classification Search
CPC .............. G06F 9/4881; G06F 12/0842; G06F 2209/486; G06F 2212/1041
See application file for complete search history.

(56) References Cited

U.S. PATENT DOCUMENTS 7,487,317 B1   2/2009 Fedorova et al.
7,925,869 B2   4/2011 Kelsey et al.
(Continued)

FOREIGN PATENT DOCUMENTS

CN   104995603 A * 10/2015 ........... G06F 9/5016
EP   2256632 A1 * 12/2010 ........... G06F 9/4887
(Continued)

OTHER PUBLICATIONS

Zviad Metreveli, et al., "CPHASH: A Cache-Partitioned Hash Table", Computer Science and Artificial Intelligence Laboratory Technical Report Massachusetts Institute of Technology, Cambridge, MA 02139 USA—www.csail.mit.edu MIT-CSAIL-TR-2011-051 Nov. 26, 2011.

*Primary Examiner* — Diem K Cao
(74) *Attorney, Agent, or Firm* — F. Chau & Associates, LLC (57) ABSTRACT

An apparatus is configured to collect information related to a first activity and analyze the collected information to determine decision data. The information is stored in a first list of the source processing core for scheduling execution of the activity by a destination processing core to avoid cache misses. The source processing core is configured to transmit information related to the decision data using an interrupt, to a second list associated with a scheduler of the destination processing core, if the destination processing core is currently executing a second activity having a lower priority than the first activity.

19 Claims, 8 Drawing Sheets

(56) References Cited

U.S. PATENT DOCUMENTS

| | | | |
|---|---|---|---|
| 8,069,290 B2 | 11/2011 | Conti et al. | |
| 9,483,321 B2 | 11/2016 | Xu et al. | |
| 2007/0143759 A1* | 6/2007 | Ozgur | G06F 9/5033 718/102 |
| 2013/0024865 A1 | 1/2013 | Yamauchi et al. | |
| 2013/0205092 A1 | 8/2013 | Roy et al. | |
| 2015/0186185 A1 | 7/2015 | Zaroo | |
| 2017/0315846 A1* | 11/2017 | Wang | G06F 15/177 |

FOREIGN PATENT DOCUMENTS

| | | | |
|---|---|---|---|
| KR | 20090119032 A * | 11/2009 | G06F 12/0868 |
| WO | 2009043043 | 4/2009 | |
| WO | 2017034738 | 3/2017 | |

\* cited by examiner

METHODS AND APPARATUS FOR CACHE-AWARE TASK SCHEDULING IN A SYMMETRIC MULTI-PROCESSING (SMP) ENVIRONMENT

CROSS-REFERENCE TO RELATED APPLICATION

This U.S. non-provisional patent application claims the benefit of priority under 35 U.S.C. § 119 to Indian Provisional Patent Application No. 201941030813 filed on Jul. 30, 2019 and Indian Patent Application No. 201941030813 filed on Jan. 22, 2020 which claims priority to the above-described Indian Provisional Patent Application No., the disclosures of which are incorporated by reference in their entirety.

BACKGROUND

1. Technical Field

The present disclosure relates to the field of data processing and more particularly to a method and apparatus for cache-aware task scheduling in a Symmetric Multi-Processing (SMP) environment.

2. Discussion of Related Art

Cache hierarchies become increasingly more complex as the number of processing cores in a processor increase. A cache hierarchy refers to a memory architecture including a hierarchy of memory storage devices having varying access speeds and sizes to cache data. The cache hierarchy can be considered a form of tiered storage that allows processor cores to process faster despite the memory latency of main memory access. Further, due to complex cache hierarchies, there can be cache misses on such architectures. The uncontrolled use of the cache hierarchy by real-time tasks may impact the estimation of a worst case execution time, especially when real-time tasks access a shared cache level, causing a contention for shared cache lines and increasing the application execution time.

SUMMARY

At least one embodiment of the inventive concept provides a method and apparatus for cache-aware task scheduling in a Symmetric Multi-Processing (SMP) environment.

At least one embodiment of the inventive concept provides a method and apparatus for reducing cache misses for both a source processing core and a destination processing core in a Symmetric Multi-Processing (SMP) environment.

An exemplary embodiment of the inventive concept provides an apparatus for cache-aware task scheduling in a multi-processing environment comprising a cache memory, a multi-core processor, wherein the multi-core processor includes a source processing core and at least one destination processing core.

For example, a size of shared data by cross cores such as source/destination processing cores, can typically be one cache line width. Further, by retaining one cache line width, cache misses may be reduced with probability from N to 1, where N can be the number of different data structures (such as a Task Management Unit (TMU), a Task Suspend List (TSL), a Task Ready List (TRL), a Task Priority Bitmap (TPB), and so on.) belonging to the destination processing core, which may be accessed by the source processing core. This also brings down the parameters that could be impacted in computing a Cache Related Preemption Delay (CRPD) from N to 1. Further, an embodiment of the inventive concept (i.e., a schedule assist method) may reduce load on a Snoop Control Unit (SCU).

The source processing core of the apparatus may be configured to add a first activity (e.g., a task) stored in a first list to a second list associated with a scheduler of the destination processing core, based on decision data.

For example, consider a Real Time Operating System (RTOS) scheduling in a multi-core SMP operating system, the first-list and the second-list may represent a group of core specific RTOS data structures such as a task ready list, a priority bitmap, and the like. Further, data structures (such as priority bitmap, task READY list) related to the RTOS scheduling may be core specific and a task SUSPEND list may be entity (such as queue/event) specific. Accordingly, the first list and the second list may be interchangeably used by the source processing core and the destination processing core.

Further, while marking the task as ready due to inter core communication activities, a suspended task may be removed from task suspend list belonging to the entity. The removed task may be placed in a task ready list of the destination processing core. Accordingly, adding the task to the second list may or may not cause the task to be removed from the first list depending on the type of activity/task. Further, tasks in consideration may be core-bounded tasks. For example, the tasks may get scheduled only in the respective cores of the tasks. Hence, the tasks may be placed in the corresponding READY lists or moved to the corresponding ready lists. The tasks stored in the READY list may be core specific and can be used by a scheduler of the destination processing core. For example, the scheduler can be a tick-less type scheduler. The task context switch may be performed via interrupts/RTOS APIs, wherein the each core of the destination processing core may run its own scheduler.

Further, a scheduling decision can be made based on task priorities and factors, for example, if task pre-emption was disabled. For example, one of the RTOS API in the source processing core could be marking a task belonging to a destination processing core as READY (that was suspended before). So, because of RTOS API, it can be one task that becomes READY or can be more than one as well. In case more than one task becomes READY, they will be placed in their respective core specific lists. The decision data can be the priority of the task and the higher priority task may need to get scheduled. Further, which destination processing core to use may be determined from a Task Control Block (TCB) (i.e., affinity information).

The source processing core of the apparatus is configured to transmit information related to the decision data to the second list using an interrupt, if the destination processing core is currently executing a second activity having a lower priority that the first activity. For example, the interrupts may be sent from the source processing core to the destination processing core. The destination core may be scheduled immediately after cross core interrupts are triggered. Further, the cross core interrupts may be defined for scheduling as the highest priority (like a non-mask-able interrupt) in a System on Chip (SoC) architecture. The destination processing core may store the information in the first list/second list in response to receipt of the interrupt. The interrupt would be triggered to indicate to the destination core about a possible change in scheduling scenario if a task of higher priority for that core becomes READY.

The information related to the decision data may be determined from the decision data. For example, scheduling decisions made in the source processing core can be passed on to the destination processing core before triggering interrupts via a resource such as 'SCHEDULE ASSIST (SCH_ASSIST)'. The information shared across cores in such cases can be a Task Management Unit (TMU) pointer or a bitmap indicating an appropriate TMU resource. Further, a remainder of the data processing may be carried out in the destination processing core. Accordingly, access to the core specific data structures may be restricted to associated cores only, in turn bringing down cache miss probability and SCU load significantly.

The second list can be for storing tasks and may store information. For example, an entity suspend list may include identifiers of activities (e.g., tasks) that have been suspended from execution. The task ready list may include identifiers of activities (e.g., tasks) that are ready for execution. The schedule assist list may include scheduling decisions that are made in the source processing core and passed on to the destination processing core. Also, the information shared across cores in such cases can be a TMU pointer or a bitmap indicating an appropriate TMU resource.

The destination processing core of the apparatus is configured to access the information in the second list associated with the destination processing core. The destination processing core accesses the information in the second list associated with the destination processing core to execute the first activity based on the information accessed from the second list. The destination processing core of the apparatus is configured to execute the first activity based on the information accessed from the second list. The activities may be tasks, event groups, signal data, or a queue (e.g., commands in a queue).

The shared data structures can be directly consumable by the system or the apparatus. The event group may be provided that allows a task to set one or more event bits within an event group. The event group can be used to synchronize tasks or for creating task. For example, if there is only one possible task to be received for a binary semaphore, then the binary semaphore can be replaced by a single bit in the event group. Further, another bit in the event group can then be used to signal that there is some data in the queue. The queue sets may be prepared specifically for waiting on a queue and signal simultaneously. Further, the threads can wait for either a signal (binary semaphore), or a message queue simultaneously.

The tasks are in the Task Suspend List (TSL)) and may be moved to READY state (the state is stored in a Task Management Unit (TMU)) when the resource becomes available (such tasks are in Task Ready List (TRL)). For example, a task can be moved to a RUNNING state when, the task becomes a highest priority resource currently in a READY state. For example, a single core RTOS typically may employ the following steps to mark a task as READY: i) remove task from TSL, ii) change task state to READY, and iii) add task entry to TRL.

Also, information shared across cores can be the TMU pointer or the bitmap indicating an appropriate TMU resource, and the remaining processing of the data may be carried out in destination processing core. Thus, access to core specific data structures may be restricted to associated cores, bringing down cache miss probability and SCU load significantly. The size of such cross core shared data can be typically kept at one cache line width, which reduces cache miss probability from N to 1, where N is the number of different data structures (such as TMU, TSL, TRL, TPB, and so on) belonging to the destination processing core, which may be accessed from the source processing core An exemplary embodiment of the inventive concept provides a method for cache-aware task scheduling in a multi-processing environment. The method includes adding, by a source processing core, a first activity (e.g., a task) stored in a first list to a second list associated with a scheduler of a destination processing core, based on decision data. The method includes transmitting, by the source processing core, information related to the decision data to the second list using an interrupt, if the destination processing core is currently executing a second activity having a lower priority than the first activity.

BRIEF DESCRIPTION OF THE DRAWINGS

Embodiments of the inventive concept will be more clearly understood from the following detailed description take in conjunction with the accompanying drawings, in which.

DETAILED DESCRIPTION OF THE EXEMPLARY EMBODIMENTS

The inventive concept and the various features and details thereof are explained more fully with reference to the exemplary embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The description herein is intended merely to facilitate an understanding of ways in which the exemplary embodiments herein can be practiced and to further enable those of skill in the art to practice the exemplary embodiments herein. Accordingly, this disclosure should not be construed as limiting the scope of the exemplary embodiments herein.

For a single core system, the steps for adding activities (e.g., tasks or jobs) to a ready list can include removing activities from a suspended list, changing the state of the activity to a READY state and then adding the activity to a ready list.

Figure 1:
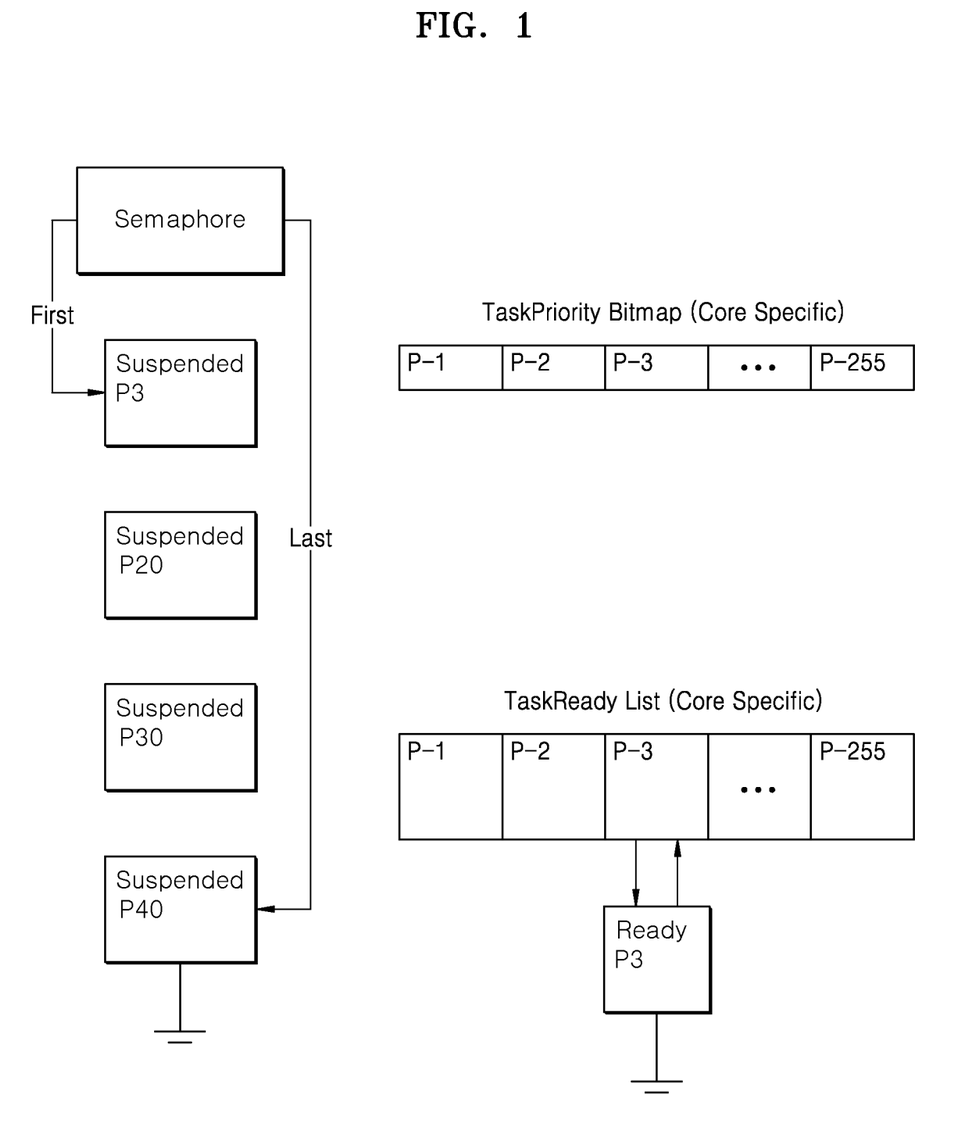
FIG. 1 illustrates an example scenario, where a semaphore is used for scheduling tasks in a multi-core processor.

FIG. 1 illustrates an example scenario, where a semaphore is used for scheduling activities in a multi-core processor. For a multi-core system, the steps for adding activities to the ready list can include removing activities from a suspended list, changing the state of an activity to the READY state, adding an activity to a core specific READY list and triggering an interrupt if required. Further, a scheduler on a destination core for which a new activity became ready may retrieve the highest READY activity from the ready list and allow the retrieved activity to execute.

Considering a source processing core of the multi-core processor, at a first step, the source processing core may remove activities from the suspended list. At a second step, the state of the activity in a Task Management Unit (TMU) is marked to a READY state. At a third step, the marked activity is added to the ready List. At a fourth step, a priority bitmap is updated. At a fifth step, preemption for a destination core is checked. For example, if an activity has been executed by a destination core with a priority 10 (P10), and an activity of high priority with a priority 5 (P5) is in the ready list, then preemption along with interrupts may be required. At a sixth step, Software Generated Interrupts (SGI) are triggered, if required.

Considering a destination processing core of the multi-core processor, at a first step, the destination processing core may get a highest READY priority bit from the priority bitmap. At a second step, the corresponding ready list is fetched. At a third step, the first available (i.e. first entry) TMU is fetched from the corresponding Task Ready List (TRL). Accordingly, since the scheduling decision has already been executed in the source processing core before triggering SGI, a definitive cache miss for a TMU pointer, ready List and priority bitmap (e.g., bits indicating which task(s) have a high or highest priority) may occur in the destination processing core. For example, if the destination core is accessing the source processing core data in an L1 cache and since the shared data will be in the L1 cache of the source core with a latest updated value, the cache miss may occur.

The producer of the data and the consumer of the data can be on different cores. The producer may produce data at a rate and the consumer may be unable to consume the produced data at the same rate or higher rate. An increase in such a consumption rate or production rate may lead to cache misses in the consumer core. The producer core may be dependent on the cache miss counter to slow down producing of the data. Further, the activity associated with the cache usage counter may schedule the activities (e.g., tasks) based on monitoring the cache usage counter. Accordingly, the core may use a learned decision to schedule certain activities based on a probable cache conflict.

Figure 2:
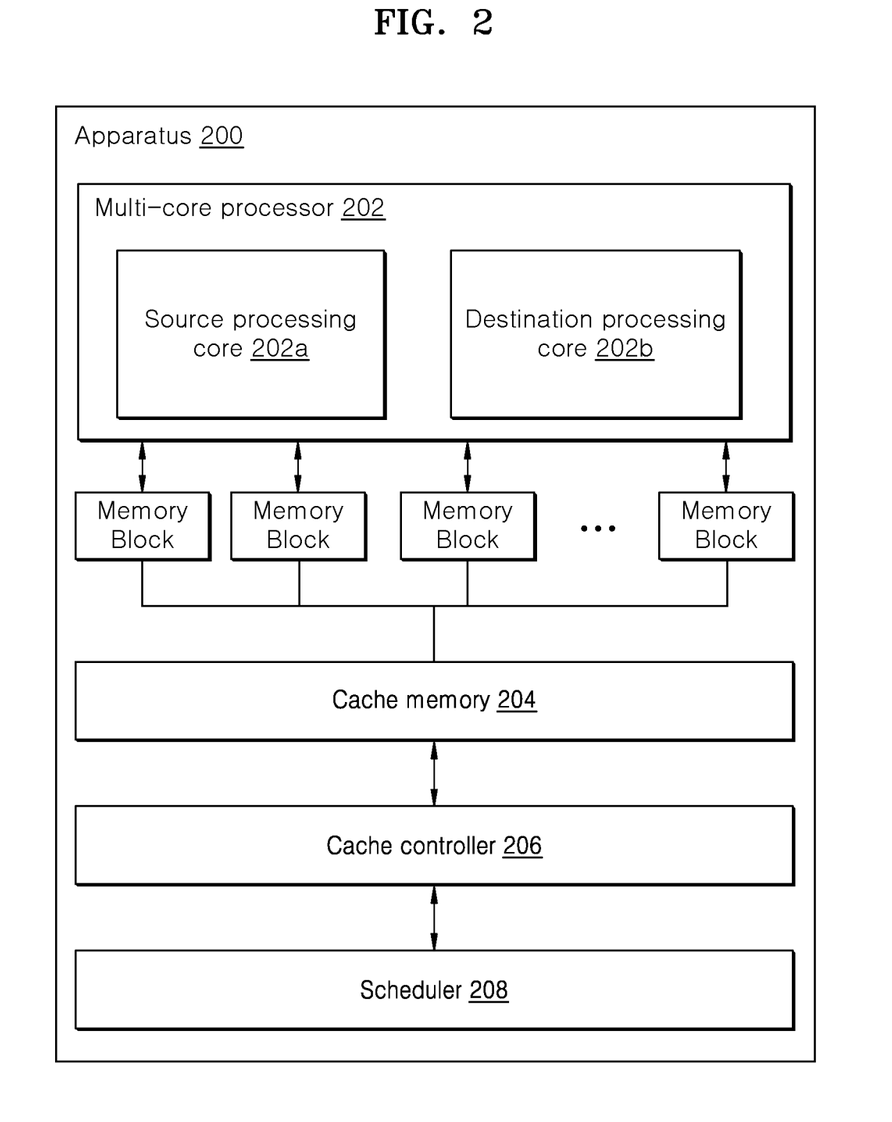
FIG. 2 illustrates an apparatus for cache-aware task scheduling in a Symmetric Multi-Processing (SMP) environment, according to an exemplary embodiment of the inventive concept.

A cache miss unit coupled with a cache may keep track of cache misses being triggered from different cores and may optimize/prioritize fetch operations according to the tracked cache misses. Further, a hash table and shared data structures may be used to pass and retrieve the operations to optimize cache miss operations sub-optimally, without considering contention of the shared cache FIG. 2 illustrates an apparatus 200 for cache-aware task scheduling in a Symmetric Multi-Processing (SMP) environment, according to an exemplary embodiment of the inventive concept.

Examples of the apparatus 200 can be at least one of, but not limited to, a server, a desktop computer, a hand-held device, a multiprocessor system, microprocessor based programmable consumer electronics, a laptop, a network computer, a minicomputer, a mainframe computer, a modem, a vehicle infotainment system, a consumer electronics item, an Internet of Things (IoT) device, a wearable device, or any other device comprising at least one touch screen interface. The apparatus 200 include a multi-core processor 202 and a cache memory 204. The cache memory 204 may include a plurality of memory blocks. Examples of the cache memory 204 can be at least one of, but not limited to, a static memory, a dynamic memory, a flash memory, a cache memory, and a Random Access Memory (RAM). The cache memory 204 can be either an instruction cache memory or a data cache memory.

The multi-core processor 202 may include a plurality of cores such as at least one source processing core 202a and at least one destination processing core 202b. The source processing core 202a can be at least one of a core 0, a core 1, a core 2, a core 3, etc. The destination processing core 202b can be at least one of the core 0, the core 1, the core 2, the core 3, etc. The source processing core 202a may assign one or more dedicated memory blocks to each core (e.g., a destination processing core) of the multi-core processor 202. The cache memory 204 may store data such as at least one of, but not limited to, a metadata, a data stream, a packet, a task, an event (e.g., event data), a signal data, and a queue (e.g., command in a queue).

The apparatus 200 may comprise a cache controller 206 (e.g., a control circuit). Further, the apparatus 200 may include a scheduler 208. The scheduler 208 can be a part of an Operating System (OS) or a Real Time Operating System (RTOS) for controlling task scheduling in the plurality of cores (such as the source processing core 202a and the destination processing core 202b). The scheduler 208 may use instructions and data structures and in-turn can be a program cached in the cache memory 204. The scheduler 208 may be configured to prioritize and dispatch execution threads (e.g., software threads) to cores 202a and 202b. Further, the apparatus 200 may also include additional modules such as, but not limited to, a Performance Monitor Unit (PMU) (not shown), and a Snoop Control Unit (SCU) (not shown). The apparatus 200 may also include Task Management Unit (not shown), that may be a part of the OS or the RTOS. The TMU may include pointers stored in a static memory or a static array. Further, the cores 202a and 202b may be configured to exchange cache read and/or write data and instructions with the cache memory 204.

The apparatus 200 may comprise a flash memory or another form of fixed or removable storage medium, which may be used to store desired programmable instructions and program data and may be accessed by the cores such as the source processing core 202a and the destination processing core 202b.

Further, an Operating System (OS)/Real Time Operating System (RTOS) of the apparatus 200 may allow partitioning of the physical address space of the cache memory 204 for cache-aware task scheduling. The cache memory 204 may permit multiple concurrent read/write operations. The Operating System (OS)/Real Time Operating System (RTOS) may include at least one sub-module such as, but not limited to, a kernel processing module, a thread managing module, a process managing module, an input/output ("I/O") managing module, a memory managing module, a controller module, a scheduler module, and a counter module. The process managing module may multitask by initializing, scheduling, and switching processes. The thread managing module may manage instantiation and execution of application threads (software threads), including receiving threads and sending threads of the multi-core processor 202. For example, the thread managing module may allocate the threads for execution among cores of the multi-core processor 202. The memory managing module may control the allocation, use, and de-allocation of the physical address space provided by the cache memory 204.

The data such as at least one of, but not limited to, the metadata, the data stream, the packet, the task, the event, the signal data, and the queue, may include at least one of, but not limited to, Central Processing Unit (CPU) data, logical processor data, Input/output data, coprocessor data, channel data, network adapter data, memory data, audio data, display data, common peripheral data, serial port data, parallel port data, OS entity data, and inter process communication data. In an example, during the execution of an activity (e.g., a task), the memory manager module may allocate a stack and a heap for allocating blocks of memory. Additionally, the required memory may depend on a type of data or data entry. In such cases, the memory may be allocated dynamically. The dynamic memory may be allocated at the heap rather than on the stack, where variables usually are stored. The allocated memory blocks may be referenced by pointers such as integer pointers or character pointers. For example, the pointer of type integer could be declared and initialized to a hexadecimal address. Dynamic memory allocation can be made through pointers. Further, the multi-core processor 202 may include a lookup table. Whenever activities (e.g., tasks) are to be partitioned across cores in the multi-core processor, the lookup table may be used to determine the assignment of the tasks to the cores 202a and 202b. The look-up table can be at least one of, but not limited to a hash table. Furthermore, the activity (e.g., task) or data may be received by the multi-core processor 202 from at least one of, but not limited to, a platform, an application, and an abstraction layer. Further, the apparatus 200 may store a plurality of lists such as first list, a second list, a third list, etc. The first list, the second list, the third list can be at least one of, but not limited to, an entity suspend list, a scheduler assist list, and a task ready list, respectively. For example, the entity suspend list may include identifiers of activities (e.g., tasks) that have been suspended from execution. For example, the tasks ready list may include identifiers of activities (e.g., tasks) that are ready for execution. For example, the tasks in RTOS may need resources and can be in a SUSPEND state (i.e., all such tasks are in Task Suspend List (TSL)/entity suspended list). They are moved to a READY state (the state is stored in a Task Management Unit (TMU)) when the resource becomes available (such tasks are in Task Ready List (TRL)). Further, the scheduler assist list may include scheduling decisions made in the source processing core 202a and can be passed on to the destination processing core 202b before triggering interrupts via a resource such as 'SCHEDULE ASSIST (SCH_ASSIST)'.

In an embodiment, the apparatus 200 may be configured by the source processing core 202a, to collect information related to at least one of a task, an event group, signal data, and a queue. The information collected can be, for example, the entity suspend list, which includes identifiers of activities (e.g., tasks) that have been suspended from execution. For example, the tasks ready list may include identifiers of activities (e.g., tasks) that are ready for execution. Further, the schedule assist list may include scheduling decisions that are made in the source processing core 202a and passed on to the destination processing core 202b. The information shared across cores in such cases can be a TMU pointer or a bitmap indicating appropriate TMU resource.

In an embodiment, the collected information is stored in an entity suspend list associated with a cache memory of the source processing core 202a. For example, internal caches can be private to the core and reside on the CPU, wherein an external cache can be shared across cores and reside on the cluster outside the CPU, between processor and main memory. The cache memory 204 can be the same for the source processing core 202a and destination processing core 202b. However, the single cache memory 204 may be partitioned for respective cores. The entity suspend list can be a look up table. In an exemplary embodiment, the information stored in the entity suspend list can be used by the destination processing core 202b as directly consumable information and also may generate data from the received information to consume the generated data in later stages. For example, the directly consumable data such as events may include information sent with an event mask and may include a few ON bits. The event/ON bits may be used to indicate if an event has occurred or not. The event/ON bits can be often referred to as event flags. For example, an application may define a bit (or flag) that means "a message has been received and is ready for processing" when it is set to 1, and "there are no messages waiting to be processed" when it is set to 0. Further, the application may define a bit (or flag) that means "the application has queued a message that is ready to be sent to a network" when it is set to 1, and "there are no messages queued ready to be sent to the network" when it is set to 0.

The data type of the ON bits (e.g., a 32 bit unsigned integer) can be consumed directly by taking some action based on it. In another example, the directly consumable data such as a signal or signal data includes information sent with a signal mask that contains a few ON bits. The data type of the ON bits (e.g., a 32 bit unsigned integer) can be consumed directly by an asynchronous signal handler in the associated task contexts. In an example, generated data and consumed data such as the queue includes information passed to a queue that can be a pointer and a size of a pool of memory, which requires some preprocessing before consumption.

Examples of the directly consumable information can be the task, the event group (e.g., a plurality of events), and the signal data. Examples of information that can be consumed at later stages include, a queue, and so on, by generating data from the information. The information/data of the event group can be data from an OS entity. The data generated from the received information can be an inter process communication to be used by another process. For example, a first process or task can send data to a second process or task via an inter process communication. The data generated from the received information can be an inter process communication to be queued for consumption at later stages. For example, a second task and a first task may need to send a message to particular queue. In an embodiment, the lookup table has a reserved memory equal to a cache line size multiplied by 'n', where 'n' is 1 or greater. For example, if the cache line size is 64 bytes 'n'=1 then 64 bytes may be acquired by hardware and provided to a CPU for execution. However the cache line size (e.g., width) can vary depending on the multi-core processor 202. The reserved memory may be equally divided across all the cores in an SMP cluster. For example, if the multi-core processor 202 is a quad core processor (i.e., includes 4 cores), then each of the cores is provided with a memory equivalent to n/4 cache line. The value of 'n' may vary based on requirements. In another example, if the OS is an RTOS, then the look up table may be a cache assisted lookup table (e.g., a CACHE_ASSIST_LOOKUP). The ache assisted lookup table may be accessed across the cores 202a and 202b instead of OS/kernel related data such as a bitmap, a Task Ready List (TRL), and multiple locks.

In an embodiment, the source processing core 202a of the apparatus 200 may be configured to analyze decision data in the collected information related to at least one of the task, the event group, the signal data, and the queue. The decision data can be a priority (i.e., a score) of the task, and the information collected can be related to the task and the decision data (i.e., a priority/score). In an embodiment, the source processing core 202a of the apparatus 200 is configured to add an activity (e.g., a task) stored in the entity suspend list (e.g., a first list) to a scheduler assist list (e.g., a second list) associated with the scheduler 208 of a destination processing core 202b, based on the analyzed decision data. The scheduler assist list can be a look up table. In an embodiment, the source processing core 202a of the apparatus 200 may be configured to transmit the information related to the decision data using an interrupt, to the scheduler assist list associated with the scheduler 208 of the destination processing core 202b, if the destination processing core 202b is executing a low priority activity and working in an interrupt enabled/disabled mode.

The apparatus 200 may work efficiently when the destination processing core 202b is scheduled immediately after cross core interrupts are triggered. It may also be possible that:

a. the destination processing core 202b, for which the information is intended may be working in an interrupt disabled mode; or
b. the apparatus 200 is a quad core system or beyond; and another parallel contending core may have got scheduled before the destination processing core 202b could consume intended data.

The above mentioned scenarios can be handled by the following:

a. defining cross core interrupts for scheduling as the highest priority (like a non-maskable interrupt) in the SoC architecture;
b. by using Fast Interrupt (FIQ) instead of SGI for inter-core communication; or
c. maintaining the SCH_ASSIST queue. Append or update the contents of SCH_ASSIST if required and one of the lower priority task entry can be added back to TRL using normal procedures.

In an embodiment, the destination processing core 202b of the apparatus 200 is configured to access the information in the scheduler assist list associated with the destination processing core 202b. In an embodiment, the destination processing core 202b of the apparatus 200 may be configured to execute at least one of the task, the event group, the signal data, and the queue based on the information accessed from the scheduler assist list. For example, the transmitted information can depict as 'schedule the TMU pointer' after finishing a particular task. Schedule the TMU pointer includes scheduling the task management unit to schedule the tasks. If TMU Pointers are being used as SCH_ASSIST, then a maximum of 4, 8 or 16 different READY task TMU pointers can be queued for each core respectively for different cache line sizes in use. The scheduler assist list can be the assisting lookup table (i.e., SCH_ASSIST) of the scheduler 208. The source processing core 202a may access the lookup table SCH_ASSIST instead of a TMU pointer, a priority bitmap and a Task Ready List (TRL).

In an embodiment, the apparatus 200 is configured to check, if a task state (e.g., a state of an activity such as a task) is marked as ready in a task ready list of the source processing core 202a. In an embodiment, the apparatus 200 may be configured to add a pointer to the task ready list, if the task state is marked as ready. The pointer is added to the task ready list to schedule/run the next task. In an embodiment, the task state is marked as a highest priority ready task. In an embodiment, the apparatus 200 is configured to swap information related to previous tasks stored in the scheduler assist list, with the information related to the task state marked as highest priority ready task. For example, the swapping includes appending or updating the contents of a SCH_ASSIST list (i.e. scheduler assist list), if required and one of the lower priority task entries can be added back to the TRL (referred as swapping) using normal procedures.

The information related to at least one of the task/previous task, the event group, the signal data, and the queue may be collected from at least one of a pointer, a counter, and a data structure. In an embodiment, the source processing core 202a is configured to swap the information related to previous tasks stored in the scheduler assist list, with the information related to the task state marked as a highest priority ready task. Further, the task ready list of the destination processing core 202b may be updated based on the information swapped in the scheduler assist list. For example, if multiple cores associated with source processing core 202a schedules a 5th priority task (P5) to be executed by the destination processing core 202b, then contention may occur between the cores. Accordingly, the swapping of the information in the SCH_ASSIST lookup table/scheduler assist list may be performed, if required. Also, for example, the first list can be an entity suspend list, the second list can be the scheduler assist list, and the third list can be the task ready list.

In an embodiment, the task ready list of the destination processing core 202b is updated based on the information swapped in the scheduler assist list. For example, if multiple cores associated with source processing core 202a schedules a 5th priority task (P5) to be executed by the destination processing core 202b, then contention may occur between the cores. For example, multiple cores of the processor can schedule a same task. The scheduling core can be named as source processing core 202a and the task executing core can be named as destination processing core 202b. For example, the contention can be at least one of, but not limited to a cache contention, a bus contention and so on. Accordingly, the swapping of the information in the SCH_ASSIST lookup table/scheduler assist list may be performed, if required.

In an embodiment, the entity suspend list and scheduler assist list comprise bit lines. Each bit line represents a task for retrieving a pointer from each bit line. In an embodiment, a ready list of the destination processing core 202b is updated after checking the scheduler assist list, before scheduling the task. In an embodiment, the source processing core 202a and the destination processing core 202b, derive cache miss counts via a Performance Monitor Unit (PMU). The PMU (e.g., a Processor) may include multiple counters related to cache misses, a CPU cycle, and instructions executed. The code under observation can be executed with a required counter ON (i.e., enabling the counter). In an embodiment, the information related to at least one of the task, the event group, the signal data, and the queue is collected from at least one of a pointer, a counter, and a data structure. In an embodiment, the source processing core 202a is configured to swap the information related to previous tasks stored in the scheduler assist list, with the information related to the task state marked as highest priority ready task, if contention occurs between the source processing cores to schedule a single task. For example, instantiated data structures may be formed and ensured that such core specific data structures are separated by cache line width. One can get away from cache contention as the cache coherency protocol gets triggered only when data in the same cache line is accessed across cores; and hence an additional overhead on the SCU is avoided. This may be possible when every core is running an independent set of tasks that do not interact across cores. The possibility of which may defy the logic of need for using multi-core subsystems (as the processing load has to be dynamically balanced, leading to inter core data sharing, synchronization or communication). Higher inter-core interactions with a kernel on each core accessing each other's data for inter-task communication and synchronization may lead to a higher load on the SCU in managing dirty lines/dirty cache lines.

The embodiments herein can comprise hardware and software elements. The embodiments that are implemented in software may include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with an instruction execution system, apparatus, or device.

Figure 3A:
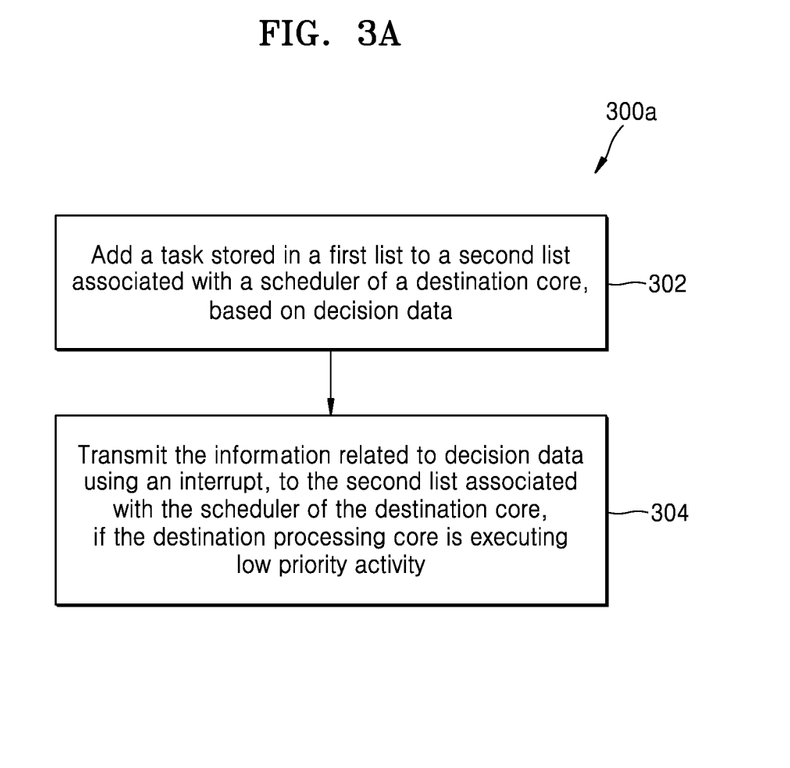
FIG. 3a is a flow chart depicting a method for cache-aware task scheduling in a SMP environment, according to an exemplary embodiment of the inventive concept.

FIG. 3a is a flow chart depicting a method 300a for cache-aware task scheduling in a SMP environment, according to an exemplary embodiment of the inventive concept.

At step 302, the method 300a includes adding, by the source processing core 202a, a task stored in a first list to a second list associated with the scheduler 208 of the destination processing core 202b, based on an decision data (e.g., analyzed decision data). At step 304, the method 300a includes transmitting, by the source processing core 202a, the information related to decision data using an interrupt, to the second list associated with the scheduler 208 of the destination processing core 202b, if the destination processing core 202b is executing a low priority activity and working in at least one of an interrupt enabled mode and an interrupt disabled mode. For example, the destination processing core 202b, for which the information is intended may be working in an interrupt disabled mode. However, the information may be transmitted to the destination processing core 202b by defining cross core interrupts for scheduling as the highest priority (like a non-mask-able interrupt) in the SoC architecture or by using Fast Interrupt (FIQ) instead of SGI for inter-core communication. Further, by maintaining the SCH_ASSIST (i.e. scheduler assist list) queue and appending or updating the contents of SCH_ASSIST, if required and one of the lower priority task entry can be added back to the TRL using normal procedures.

The various actions in method 300a may be performed in the order presented, in a different order or simultaneously. Further, in some embodiments, some actions listed in FIG. 3a may be omitted.

Figure 3B:
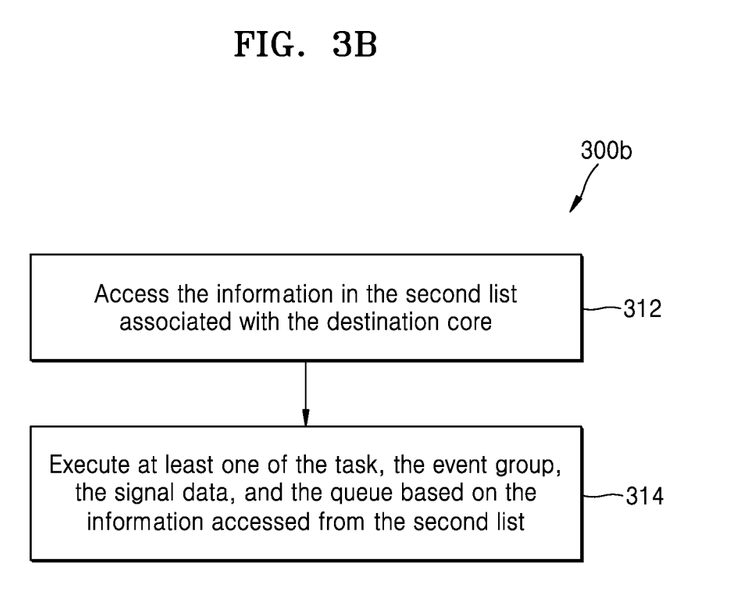
FIG. 3b is a flow chart depicting a method for executing, by the destination processing core, at least one of a task, an event group, and signal data, according to an exemplary embodiment of the inventive concept.

FIG. 3b is a flow chart depicting a method 300b for executing, by the destination processing core, at least one of the task, the event group, the signal data, according to an exemplary embodiment of the inventive concept.

At step 312, the method 300b includes accessing, by the destination processing core 202b, the information in the second list associated with the destination processing core 202b. At step 314, the method 300b includes executing, by the destination processing core 202b, at least one of the task, the event group, the signal data, and the queue based on the information accessed from the second list.

The various actions in method 300b may be performed in the order presented, in a different order or simultaneously. Further, in some embodiments, some actions listed in FIG. 3b may be omitted.

Figure 3C:
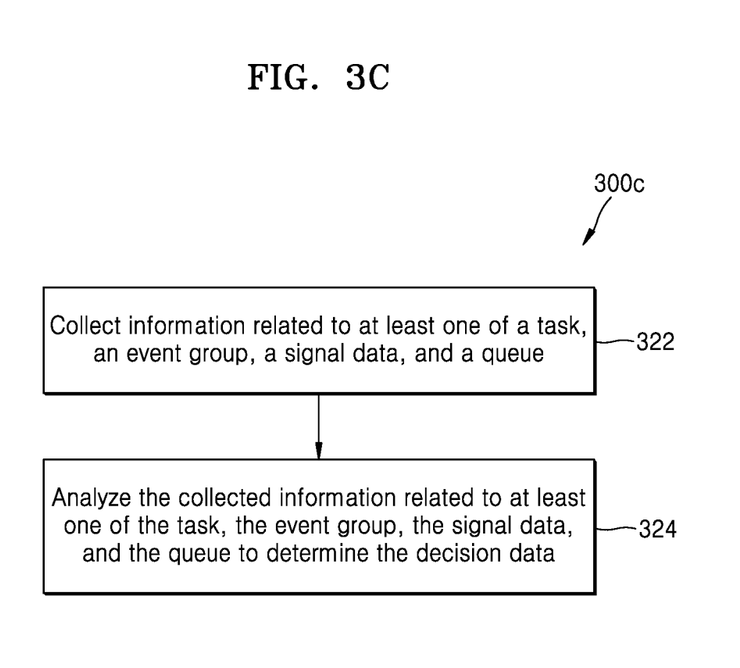
FIG. 3c is a flow chart depicting a method for analyzing, by the source processing core, decision data in the collected information, according to an exemplary embodiment of the inventive concept.

FIG. 3c is a flow chart depicting a method 300c for analyzing, by the source processing core 202a, a decision data in the collected information, according to an exemplary embodiment of the inventive concept.

At step 322, the method 300c includes collecting, by the source processing core 202a, information related to at least one of a task, an event group, a signal data, and a queue. In an embodiment, the collected information is stored in a first list associated with a cache memory of the source processing core. At step 324, the method 300c includes analyzing, by the source processing core 202a, the collected information related to at least one of the task, the event group, the signal data, and the queue to determine the decision data.

The various actions in method 300c may be performed in the order presented, in a different order or simultaneously. Further, in some embodiments, some actions listed in FIG. 3c may be omitted.

Figure 3D:
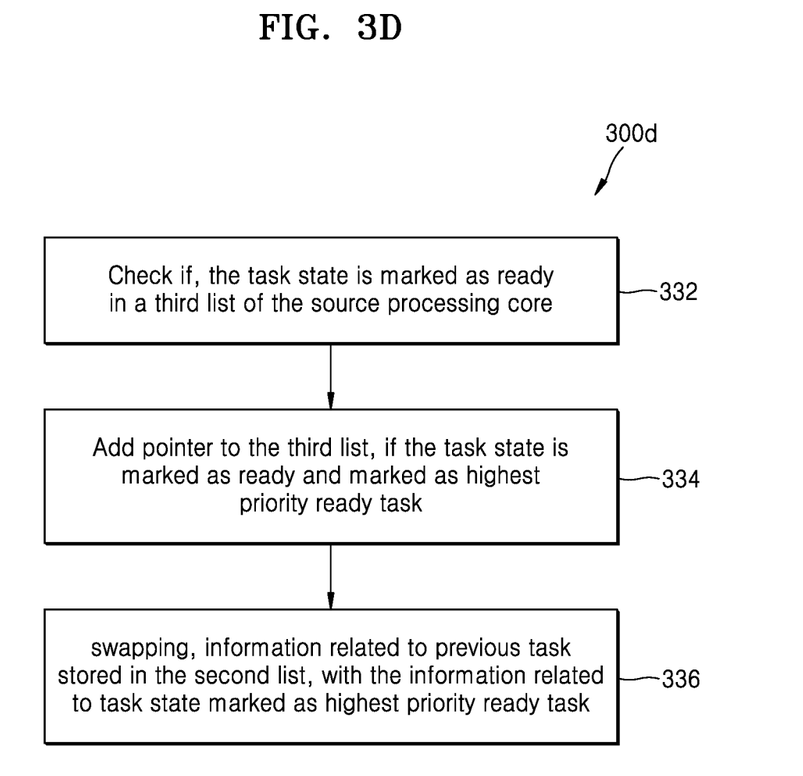
FIG. 3d is a flow chart depicting a method for swapping, by the source processing core, information related to a previous task stored in a second list, according to an exemplary embodiment of the inventive concept.

FIG. 3d is a flow chart depicting a method 300d for swapping, by the source processing core 202a, information related to a previous task stored in the second list, according to an exemplary embodiment of the inventive concept.

At step 332, the method 300d includes checking, by the source processing core 202a, if the task state is marked as ready in a third list of the source processing core 202a. At step 334, the method 300d includes adding, by the source processing core 202a, a pointer to the third list, if the task state is marked as ready and marked as a highest priority ready task. For example, the task ready list can be the third list, wherein the source processing core 202a and the destination processing core 202b can have the third list. At step 336, the method 300d includes swapping, by the source processing core 202a information related to previous task stored in the second list, with the information related to task state marked as highest priority ready task. Accordingly, priority based preemptive scheduling can be one of the predominantly used mechanisms in SMP RTOS. The tasks across cores interact with each other for either communication or synchronization purpose; and hence inadvertently end up accessing shared core specific resources. This builds up scenarios; which may lead to wasted cycles in processor computing in notifying cache memory sub-systems across cores due to increased load on the SCU. The tasks in a suspended state may be stored in the Task Suspend List (TSL) and the tasks are moved to the READY state (the state is stored in a Task Management Unit (TMU)) when the resource becomes available (such tasks are in Task Ready List (TRL)) and moved to the RUNNING state when the tasks become highest priority resource currently in a READY state. Further, the priority of the activities/tasks currently being carried out in the destination core is referred to and an interrupt would be triggered to indicate to the destination core about a possible change in scheduling scenario if a task of higher priority for that core becomes READY.

For example, consider the destination processing core 202b is currently executing a high priority task/activity.

Further, the priority of the activities currently being carried out in the destination processing core 202*b* may be referred to; and an interrupt would be triggered to indicate to the destination core about a possible change in scheduling scenario, if the task of higher priority for that core becomes READY. Further, if the priority score in the priority bitmap is more for the upcoming highest priority task, then the currently running high priority task would be replaced by the most highest priority task (i.e. upcoming task) and would be executed.

The various actions in method 300*d* may be performed in the order presented, in a different order or simultaneously. Further, in some embodiments, some actions listed in FIG. 3*d* may be omitted.

Figure 4A:
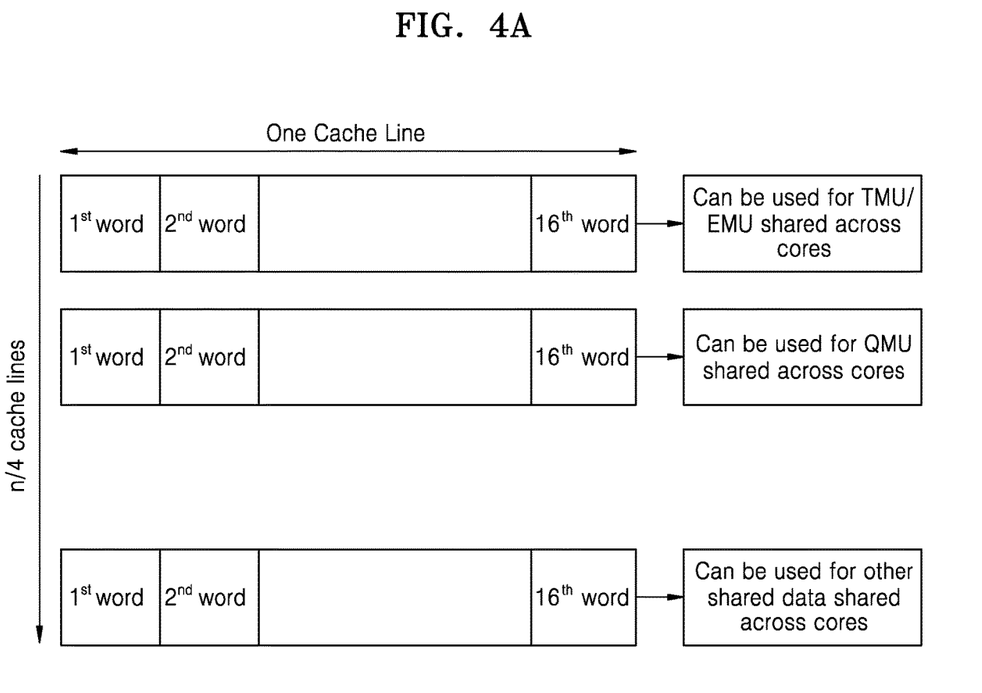
FIG. 4a illustrates an example scenario, where a lookup table is used for cache-aware task scheduling in a SMP environment, according to an exemplary embodiment of the inventive concept.

FIG. 4*a* illustrates an example scenario, where a lookup table is used for cache-aware task scheduling in a SMP environment, according to embodiments as disclosed herein.

In an example, the look up table size can be n/4 lines per core (each core may be allocated with memory equivalent to n/4 cache line; 'n' may indicate cache line width and may vary based on requirements. As shown in the FIG. 4*a*, 1 word can be of 4 bytes in size. At a first step, the source processing core 202*a* may set a reserved area such as a look up table, during making a task ready or when setting a flag to indicate a task is ready. At a second step, the destination processing cores 202*b*, may access the information stored in the lookup table, based on the requirement(s).

Figure 4B:
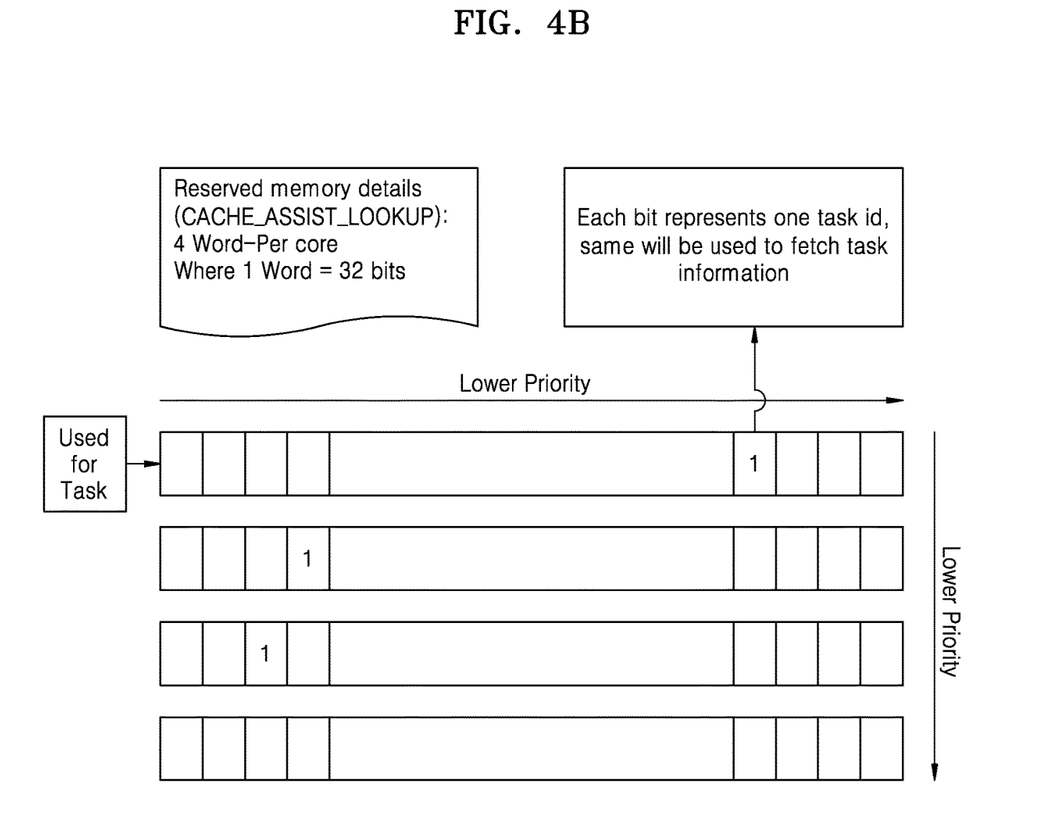
FIG. 4b illustrates an example scenario, where a lookup table is used in a quad core processor for cache-aware task scheduling in a SMP environment, according to an exemplary embodiment of the inventive concept.

FIG. 4*b* illustrates an example scenario, where a lookup table is used in quad core processor for cache-aware task scheduling in a SMP environment, according to embodiments as disclosed herein.

In an example, the cache line size can be 4 words per core, if the OS is RTOS, where one word is 32 bits in size. The value of 'n' may vary based on requirements. In another example, if the OS is RTOS, then the look up table may be a cache assisted lookup table (i.e. CACHE_ASSIST_LOOKUP), the CACHE_ASSIST_LOOKUP may be accessed across the cores 202*a* and 202*b* instead of OS/kernel related data such as bitmap, Task Ready List (TRL), multiple locks, and so on.

At a first step, the source processing core 202*a* may enable a bit in the reserved area such as look up table, during making the task ready (i.e., bits marked as 1 are enabled). At a second step, the destination processing cores 202*b*, may access the available highest priority task stored in the lookup table and may disable a highest priority bit.

The destination processing core 202*b* may clear the highest priority bit because it currently/next executes the same task of highest priority. The use of bitmaps would support enough task count and would require each task to be associated with a unique identifier bit in the bitmap. The disabling of the highest priority bit may be due to the task (i.e., highest priority task) being currently executed.

The embodiments disclosed herein can be implemented through at least one software program running on at least one hardware device and performing network management functions to control the elements. The elements shown in FIG. 2 can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein can be practiced with modification within the spirit and scope of the embodiments as described herein.

What is claimed is:

1. An apparatus for cache-aware task scheduling in a multi-processing environment comprising:
   a cache memory; and
   a multi-core processor comprising a source processing core and at least one destination processing core,
   wherein the source processing core is configured to add a first activity stored in a first list of the apparatus to a second list of the apparatus associated with a scheduler of the destination processing core, based on a priority of the first activity,
   wherein the source processing core is configured to determine a resource of the first activity and transmit information indicating the resource to the second list using an interrupt, if the destination processing core is currently executing a second activity having a lower priority than the first activity and working in an interrupt enabled/disabled mode, and
   wherein the destination processing core accesses the information in the second list and executes the first activity based on the information accessed from the second list in response to receipt of the interrupt and otherwise continues the executing of the second activity.

2. The apparatus of claim 1, wherein the source processing core is further configured to:
   collect information related to at least one of a task, an event group, signal data, and a queue, wherein the collected information is stored in the first list associated with the cache memory of the source processing core; and
   analyze the collected information to determine the priority.

3. The apparatus of claim 2, wherein the information related to at least one of the task, the event group, the signal data, and the queue is collected from at least one of a pointer, a counter, and a data structure.

4. The apparatus of claim 1, wherein the source processing core is further configured to:
   check, information related to a state in a third list of the source processing core to determine the state of the first activity;
   add a pointer to the third list, if the state indicates the first activity is ready and has a highest priority; and
   swap information related to a previous activity stored in the second list, with the information related to the state,
   wherein a third list of the destination processing core is updated based on the information swapped in the second list and after checking the second list, before scheduling the first activity.

5. The apparatus of claim 4, wherein the source processing core is configured to swap the second list, if a contention occurs between the source processing core and another processing core to schedule the first activity.

6. The apparatus of claim 4, wherein the source processing core is configured to set a reserved area in the cache memory corresponding to the first list and enable a bit in the reserved area when the state indicates the first activity is ready.

7. The apparatus of claim 4, wherein the destination processing core is configured to access at least one of the information and an activity stored in the second list having a highest priority, and clear a bit indicating the activity has the highest priority.

8. The apparatus of claim 1, wherein the first list and the second list comprise bit lines, wherein each bit line represents a different task.

9. The apparatus of claim 1, wherein the information and the first activity in at least one of the first list and the second list is directly consumable information and the apparatus uses the information to generate data that can be used by at least one of the source processing core and the destination processing core.

10. A method for cache-aware task scheduling in a multi-processing environment comprising:
   adding, by a source processing core, a first activity stored in a first list of an apparatus to a second list of the apparatus associated with a scheduler of a destination processing core, based on a priority of the first activity;
   determining, by the source processing core, a resource of the first activity;
   transmitting, by the source processing core, information indicating the resource to the second list using an interrupt, if the destination processing core is currently executing a second activity having a lower priority than the first activity and working in an interrupt enabled/disabled mode; and
   performing, by the destination processing core, accessing of the information in the second list associated with the destination processing core and executing of the first activity based on the information accessed from the second list in response to receipt of the interrupt and otherwise continuing the executing of the second activity.

11. The method of claim 10, herein the information is related to at least one of a task, an event group, signal data, and a queue.

12. The method of claim 11, further comprises:
   collecting, by the source processing core, information related to at least one of a task, an event group, a signal data, and a queue, wherein the collected information is stored in the first list associated with the cache memory of the source processing core; and
   analyzing, by the source processing core, the collected information to determine the priority.

13. The method of claim 11, further comprises:
   checking, by the source processing core, information related to a state in a third list of the source processing core to determine the state of the first activity;
   adding, by the source processing core, a pointer to the third list, if the state indicates the first activity is ready and has a highest priority; and
   swapping, by the source processing core, information related to a previous activity stored in the second list, with the information related to the state,
   wherein a third list of the destination processing core is updated based on the information swapped in the second list and after checking the second list, before scheduling the first activity.

14. The method of claim 13, wherein the information related to at least one of the task, the event group, the signal data, and the queue is collected from at least one of a pointer, a counter, and a data structure.

15. The method of claim 11, wherein the first list and the second list comprise bit lines, wherein each bit line represents a different activity.

16. The method of claim 15, wherein the source processing core is configured to swap the second list, if contention occurs between the source processing core and another processing core to schedule the task.

17. The method of claim 15, wherein the source processing core is configured to set a reserved area of a cache memory corresponding to the first list and enable a bit in the reserved area, when the state indicates the first activity is ready.

18. The method of claim 15, wherein the destination processing core is configured to access at least one of the information and an activity stored in the second list having a highest priority, and a bit indicating the activity has the highest priority.

19. The method of claim 11, wherein the information and the first activity in at least one of the first list and the second list is directly consumable information and the method further includes using the information to generate data that can be used by at least one of the source processing core and the destination processing core.

* * * * *